(12) United States Patent
Komatsu et al.

(10) Patent No.: US 7,489,049 B2
(45) Date of Patent: Feb. 10, 2009

(54) ANTITHEFT DEVICE

(75) Inventors: Hideki Komatsu, Kitasoma-gun (JP);
Genroku Sugiyama, Ryugasaki (JP);
Hiroyuki Adachi, Inashiki-gun (JP);
Kazuhiro Shibamori, Mitsukaido (JP);
Koichi Shibata, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 399 days.

(21) Appl. No.: 10/538,883

(22) PCT Filed: Dec. 16, 2003

(86) PCT No.: PCT/JP03/16096

§ 371 (c)(1),
(2), (4) Date: Aug. 12, 2005

(87) PCT Pub. No.: WO2004/054854

PCT Pub. Date: Jul. 1, 2004

(65) Prior Publication Data
US 2006/0109090 A1   May 25, 2006

(30) Foreign Application Priority Data
Dec. 16, 2002   (JP) .............................. 2002-363947

(51) Int. Cl.
*B60R 25/00* (2006.01)
(52) U.S. Cl. .................. 307/10.2; 340/988; 340/989
(58) Field of Classification Search ............ 307/10.2; 340/426.1, 988; 701/213; 455/404.2
See application file for complete search history.

(56) References Cited
U.S. PATENT DOCUMENTS
5,223,844 A * 6/1993 Mansell et al. ......... 342/357.07
(Continued)
FOREIGN PATENT DOCUMENTS
JP          10-1336760         12/1998
(Continued)

OTHER PUBLICATIONS
International Search Report No. PCT/JP03/16096, dated Mar. 9, 2004.

*Primary Examiner*—Michael J Sherry
*Assistant Examiner*—Daniel Cavallari
(74) *Attorney, Agent, or Firm*—Crowell & Moring LLP

(57) ABSTRACT

An antitheft system can be provided by constructing such that, when a stop signal has been inputted from an engine 7, a main controller 2 outputs, until a first predetermined time Ts elapses, a turn-on signal to switches 8, 9 to perform a similar antitheft processing as in an operation of the engine 7 and after an elapse of the first predetermined time Ts, instructs the switch 9 to repeat a turn-on and turn-off at predetermined time intervals Δt, and, whenever the switch 9 is brought into a turned-on position, detects a position at that time by a position detecting controller 3 and compares the position with a position at the time of an engine stop to determine whether or not a theft has taken place. Owing to this construction, it is no longer necessary to always feed power to the position detecting controller 3 during the stop of the engine 7, thereby making it possible to cut down the feeding of as much power to the controller 3 as a time elapsed during which the switch 9 is kept off. The antitheft system can, therefore, minimize the power consumption of a control system during the engine stop.

10 Claims, 10 Drawing Sheets

U.S. PATENT DOCUMENTS

| | | | | |
|---|---|---|---|---|
| 6,507,786 B2* | 1/2003 | Flick | | 701/213 |
| 6,509,868 B2* | 1/2003 | Flick | | 342/357.07 |
| 6,512,465 B2* | 1/2003 | Flick | | 340/989 |
| 6,512,466 B2* | 1/2003 | Flick | | 340/989 |
| 6,522,265 B1* | 2/2003 | Hillman et al. | | 340/988 |
| 6,522,267 B2* | 2/2003 | Flick | | 340/989 |
| 6,611,755 B1* | 8/2003 | Coffee et al. | | 701/213 |
| 6,693,563 B2* | 2/2004 | Flick | | 340/989 |
| 6,696,982 B2* | 2/2004 | Yoshioka et al. | | 340/988 |
| 6,703,946 B2* | 3/2004 | Flick | | 340/989 |
| 6,717,508 B2* | 4/2004 | Sashida | | 340/5.72 |
| 6,737,989 B2* | 5/2004 | Flick | | 340/989 |
| 6,741,187 B2* | 5/2004 | Flick | | 340/989 |
| 6,744,384 B2* | 6/2004 | Flick | | 340/989 |
| 6,765,499 B2* | 7/2004 | Flick | | 340/989 |
| 6,765,500 B2* | 7/2004 | Flick | | 340/989 |
| 6,771,188 B2* | 8/2004 | Flick | | 340/989 |
| 6,784,809 B2* | 8/2004 | Flick | | 340/989 |
| 6,798,355 B2* | 9/2004 | Flick | | 340/989 |
| 6,798,356 B2* | 9/2004 | Flick | | 340/989 |
| 6,803,861 B2* | 10/2004 | Flick | | 340/989 |
| 6,804,605 B2* | 10/2004 | Flick | | 701/213 |
| 6,809,659 B2* | 10/2004 | Flick et al. | | 340/989 |
| 6,816,089 B2* | 11/2004 | Flick | | 340/989 |
| 6,819,269 B2* | 11/2004 | Flick | | 340/989 |
| 6,844,827 B2* | 1/2005 | Flick | | 340/989 |
| 6,856,879 B2* | 2/2005 | Arakawa et al. | | 701/50 |
| 6,888,495 B2* | 5/2005 | Flick | | 342/357.07 |
| 6,924,750 B2* | 8/2005 | Flick | | 340/989 |
| 6,972,667 B2* | 12/2005 | Flick | | 340/426.18 |
| 7,015,830 B2* | 3/2006 | Flick | | 340/989 |
| 7,031,835 B2* | 4/2006 | Flick | | 701/213 |
| 7,102,491 B2* | 9/2006 | Ando et al. | | 340/426.1 |
| 7,110,728 B2* | 9/2006 | Mizui et al. | | 455/99 |
| 7,149,530 B1* | 12/2006 | Arakawa et al. | | 455/456.1 |
| 7,149,623 B2* | 12/2006 | Flick | | 701/207 |
| 7,171,187 B2* | 1/2007 | Haave et al. | | 455/404.2 |
| 7,176,788 B2* | 2/2007 | Park | | 340/426.19 |
| 7,183,666 B2* | 2/2007 | Arakawa et al. | | 307/10.2 |
| 7,212,103 B2* | 5/2007 | Oyagi et al. | | 340/429 |
| 2001/0029051 A1 | 10/2001 | Hyodo et al. | | |

FOREIGN PATENT DOCUMENTS

| | | |
|---|---|---|
| JP | 2001-191901 | 7/2001 |
| JP | 2000-72727 | 9/2001 |

* cited by examiner

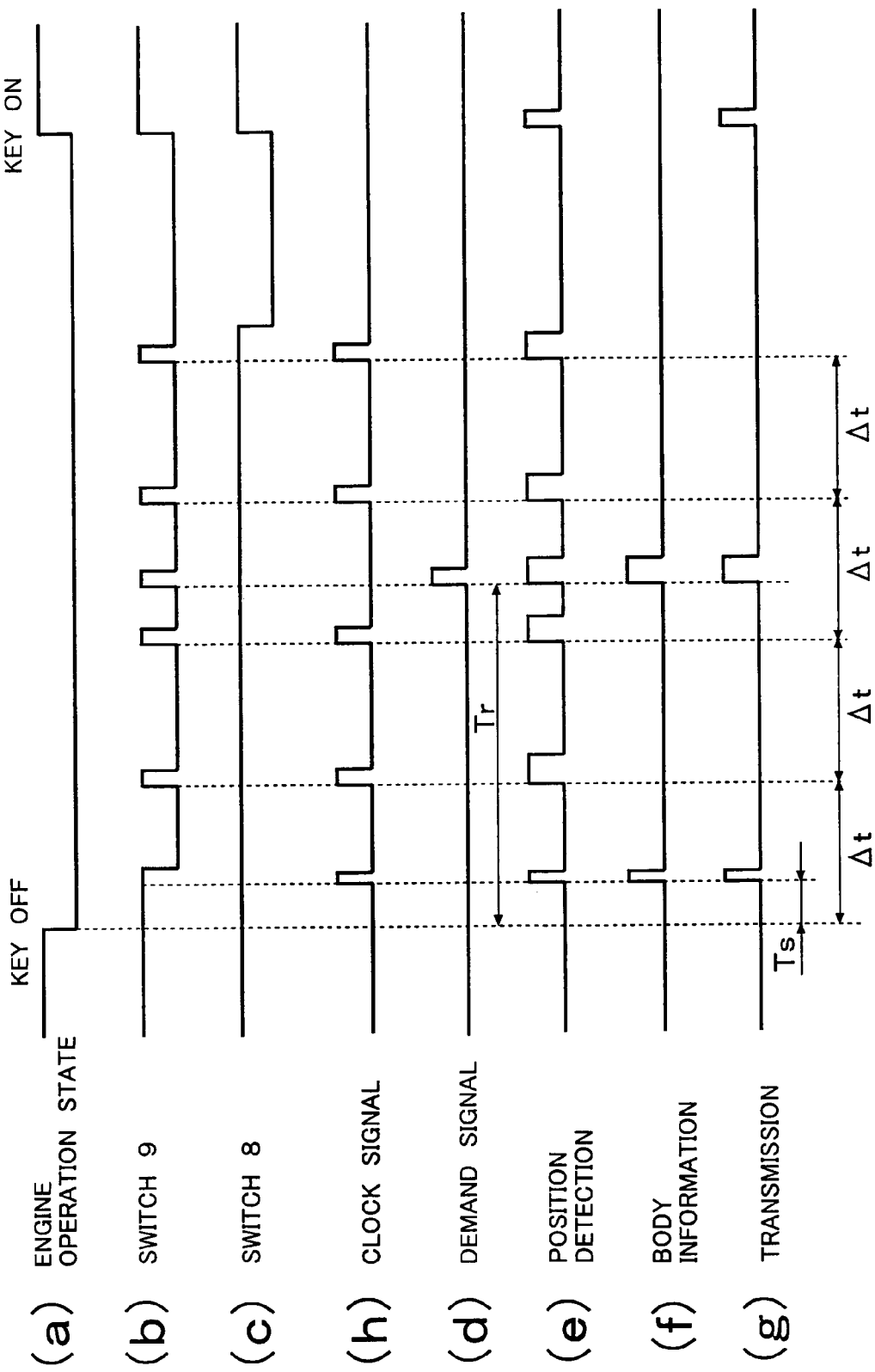

ANTITHEFT DEVICE

TECHNICAL FIELD

This invention relates to an antitheft system, which is arranged on a self-propelling movable object including a construction machine such as a hydraulic excavator and makes it possible to ascertain the position of the movable object on the side of a control server located at a place remote from the movable object.

BACKGROUND ART

As an antitheft system of this type, there is disclosed, for example, in JP 2000-73411 A a technology that detects, for example, by a global positioning system, i.e., GPS the position of a hydraulic excavator as a self-propelling movable object under control, transmits by wireless communication the thus-detected position of the hydraulic excavator to a control server located at a remote place, and ascertains by the control server whether or not the position of the hydraulic excavator is within a predetermined normal work area.

According to this conventional technology, when the position of the hydraulic excavator as detected by GPS has been determined to depart from the normal work area, an engine stop signal is transmitted from the control server to a control system mounted on the hydraulic excavator to stop an operation of the hydraulic excavator.

As described above, the conventional technology makes it possible to promptly infer the theft of the hydraulic excavator and to disable work such as digging or running by the hydraulic excavator and, because the hydraulic excavator becomes no longer possible of self-propelling, also makes it difficult to load the hydraulic excavator on a vehicle for carrying it away, for example, a trailer. Accordingly, the conventional technology can scare away a potential thief and practically, can make it difficult to steal, thereby serving as an effective technology for the prevention of a theft.

Among self-propelling movable objects, construction machines such as hydraulic excavators, in particular, are often stolen at night after finishing work. While being transported on a trailer or the like, the engine of the hydraulic excavator is in a stopped state. There is, accordingly, a need for the development of a countermeasure for a theft while the engine is stopped. In the above-described conventional technology, no reference is specifically made as to the time during which the engine is stopped. When constructed, for example, to continuously feed power to a control system, which performs positional detections and transmissions/receptions to/from a control server, always including the time during which the engine is stopped, the voltage of a power supply, i.e., a battery mounted on the hydraulic excavator, however, drops (undergoes a battery drainage) in a short time so that frequent recharging is required. When constructed, as in the conventional technology, to transmit the position information on the hydraulic excavator to the side of the control server and to determine on the side of the control server whether or not the hydraulic excavator has departed from a normal work area, on the other hand, the number of communications between the hydraulic excavator and the control server becomes great, resulting in a substantial communication cost. Therefore, a problem also remains unsolved in this respect.

The present invention has been completed in view of the above-described problems of the conventional technology. A first object of the present invention is, therefore, to provide an antitheft system which can ascertain the position of a movable object even during stopping of an engine while reducing the consumption of power by a control system during the stopping of the engine and avoiding a battery drainage. Further, a second object of the present invention is to provide an antitheft system which can keep the communication cost low by minimizing the number of communications with a control server.

DISCLOSURE OF THE INVENTION

To achieve the first object, the present invention is characterized in that in an antitheft system provided with a control system arranged on a self-propelling movable object with an engine mounted thereon as a drive source and having a position detecting means for detecting a position of the movable object, a transmission/reception means for performing a transmission/reception to/from an outside and a processing means for performing predetermined processing operations including outputs of run commands to the position detecting means and the transmission/reception means and a control server arranged at a place different from the movable object for controlling information on the movable object, said information comprising position information detected by the position detecting means and transmitted via the transmission/reception means, the antitheft system comprises a clocking means, a first power feeding means for performing feeding of power to at least the position detecting means, and a second power feeding means for performing feeding of power to at least the clocking means, and the processing means receives signals from the clocking means, allows the first power feeding means to continuously feed power until a first predetermined time elapses from a time point at which a stop signal for the engine is inputted, and after an elapse of the first predetermined time, repeatedly outputs an instruction signal, which permits feeding of power, at predetermined time intervals to the first power feeding means.

By constructing as described above, the current position of the movable object can be detected by the position detecting means in a similar manner as in the time of an operation of the engine until the first predetermined time elapses from a time point at which the engine is stopped. After the elapse of the first predetermined time, the feeding of power by the first power feeding means is stopped so that the feeding of power to the position detecting means is stopped. To the clocking means, however, power is continuously fed from the second power feeding means. Based on signals from the clocking means, power is fed at the predetermined time intervals from the first power feeding means to the position detecting means so that a positional detection is performed intermittently. Namely, power is intermittently fed from the first power feeding means to the position detecting means after the elapse of the first predetermined time. The consumption of power at the position detecting means can, therefore, be cut down as much as the stopping of power feeding.

It is, therefore, possible to prolong the time until the battery mounted on the movable object comes into the state of a battery drainage.

On the other hand, the invention described in claim 5 to achieve the second object is characterized in that the control system is provided with a storage means for storing the position information on the movable object as detected by the position detecting means, and the processing means compares position information, which has been detected subsequent to the input of the stop signal for the engine, with the position information stored in the storage means and, when a distance difference of at least a predetermined value is confirmed, determines that the movable object has been stolen, and instructs the transmission/reception means to transmit a theft signal together with the position information to the control server.

By constructing as described above, whether or not the movable object has been moved, in other words, stolen can be determined despite the stopping of the engine by the control system mounted on the movable object. Because a report is made to the side of the control server via the transmission/reception means only when a theft has been determined, the number of communications with the control server can be reduced so that the communication cost can be kept low.

As described above in detail, the present invention can detect the current position of the movable object by the position detecting means in a similar manner as in the time of an operation of the engine until the first predetermined time elapses from a time point at which the engine is stopped, and after the elapse of the first predetermined time, can feed power at the predetermined time intervals from the first power feeding means to the position detecting means so that a positional detection can be performed intermittently. Namely, power is intermittently fed from the first power feeding means to the position detecting means after the elapse of the first predetermined time. The consumption of power at the position detecting means can, therefore, be cut down as much as the stopping of power feeding. Accordingly, it is possible to prolong the time until the battery mounted on the movable object comes into the state of a battery drainage.

Further, whether or not the movable object has been stolen can be determined by the control system mounted on the movable object and, only when a theft has been determined, a report is made to the side of the control server via the transmission/reception means. Accordingly, the number of communications with the control server can be reduced so that the communication cost can be kept low.

BRIEF DESCRIPTION OF THE DRAWINGS

FIG. 10 is a time chart illustrating a modification of the time chart for the first embodiment as shown in FIG. 8.

BEST MODES FOR CARRYING OUT THE INVENTION

Based on the drawings, a description will hereinafter be made about the embodiment of the present invention.

Figure 1:
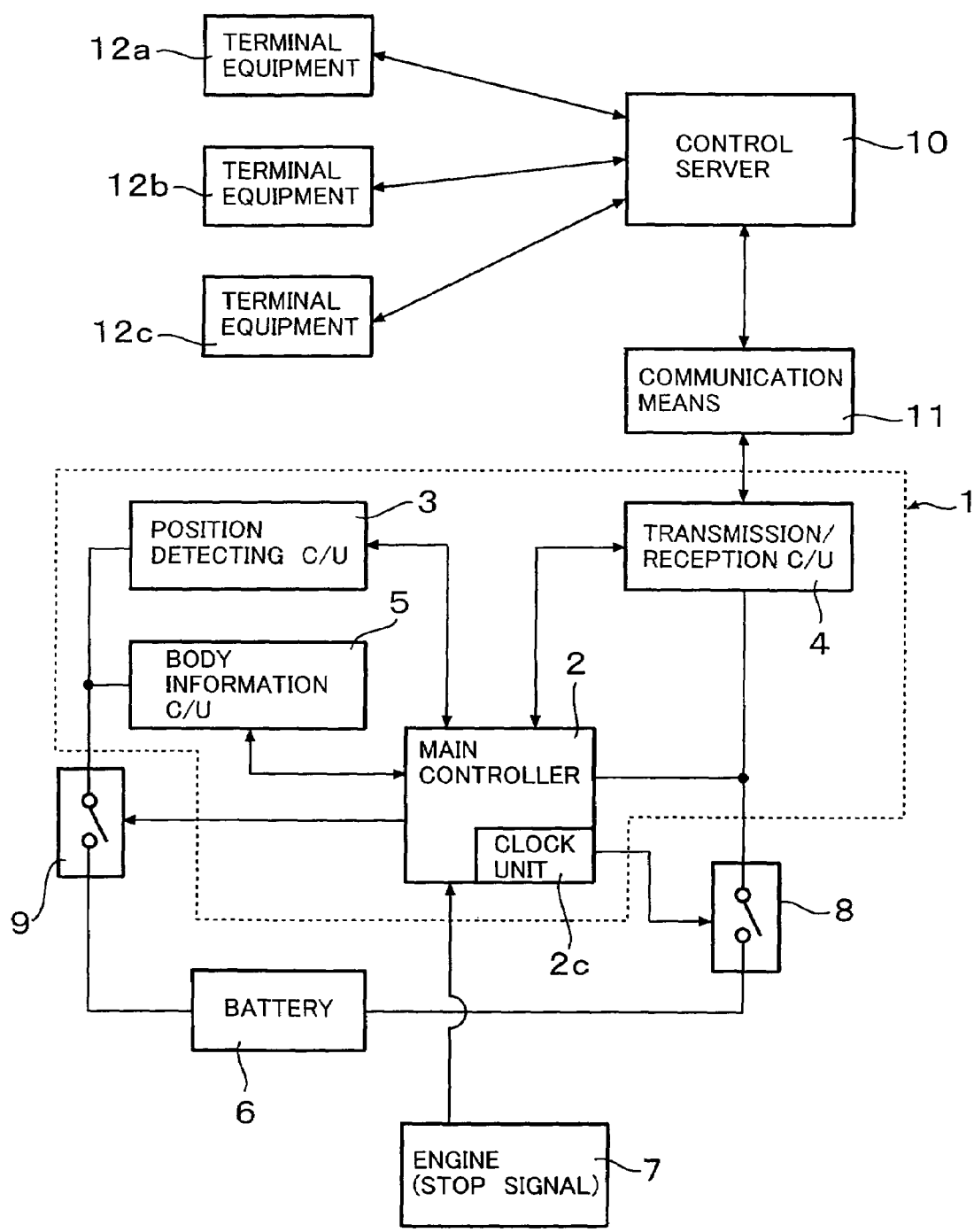
FIG. 1 is an overall construction diagram of an antitheft system according to an embodiment of the present invention.
Figure 2:
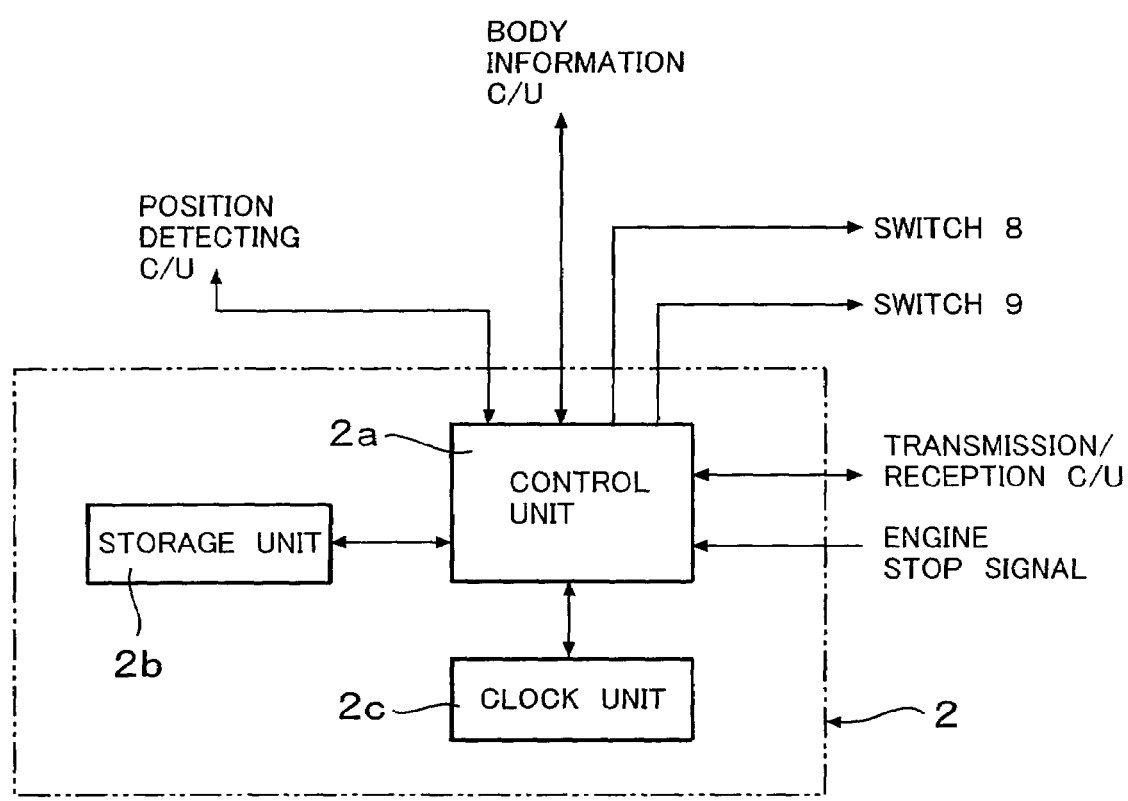
FIG. 2 is a block diagram of a main controller shown in FIG. 1.
Figure 3:
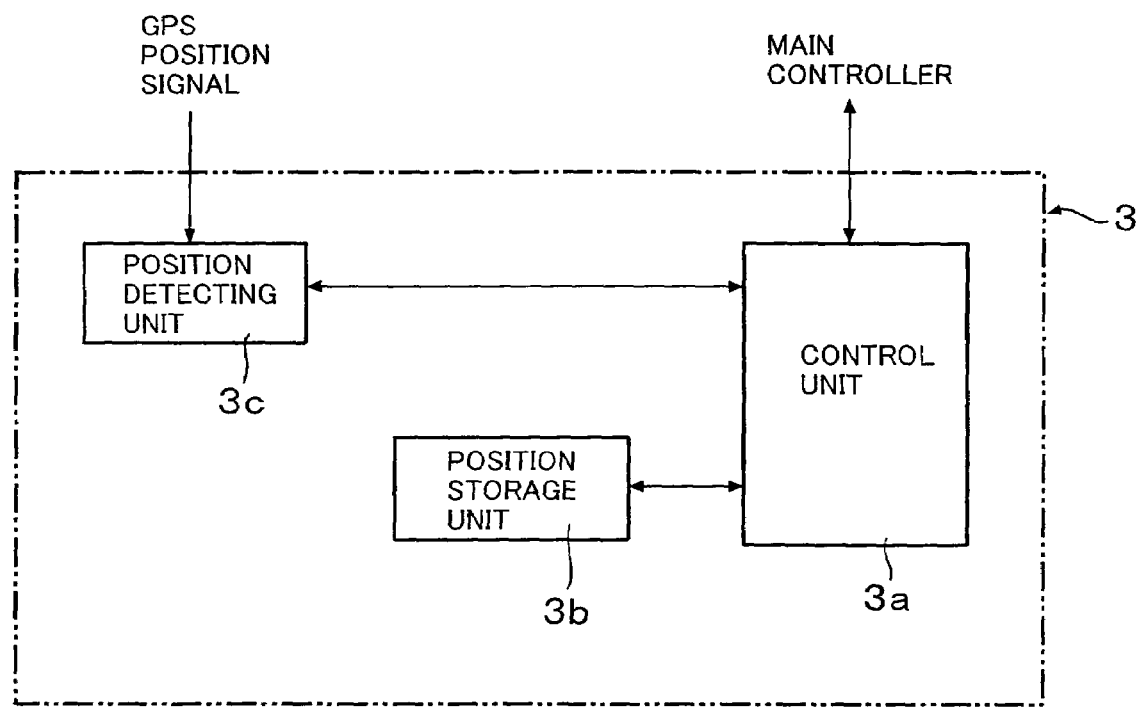
FIG. 3 is a block diagram of a position detecting control unit shown in FIG. 1.
Figure 4:
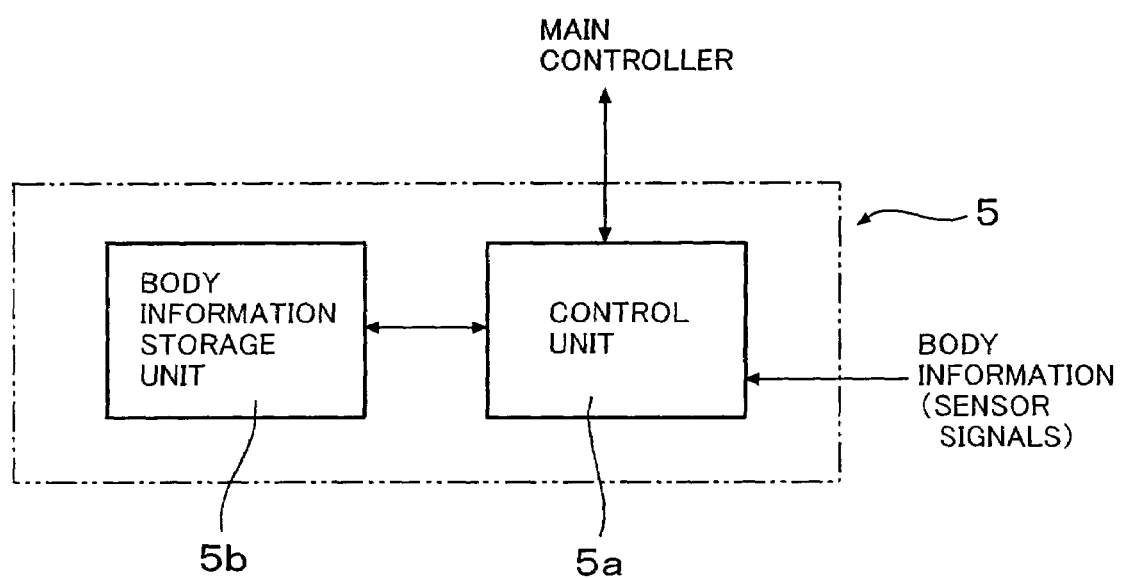
FIG. 4 is a block diagram of a body information control unit shown in FIG. 1.
Figure 5:
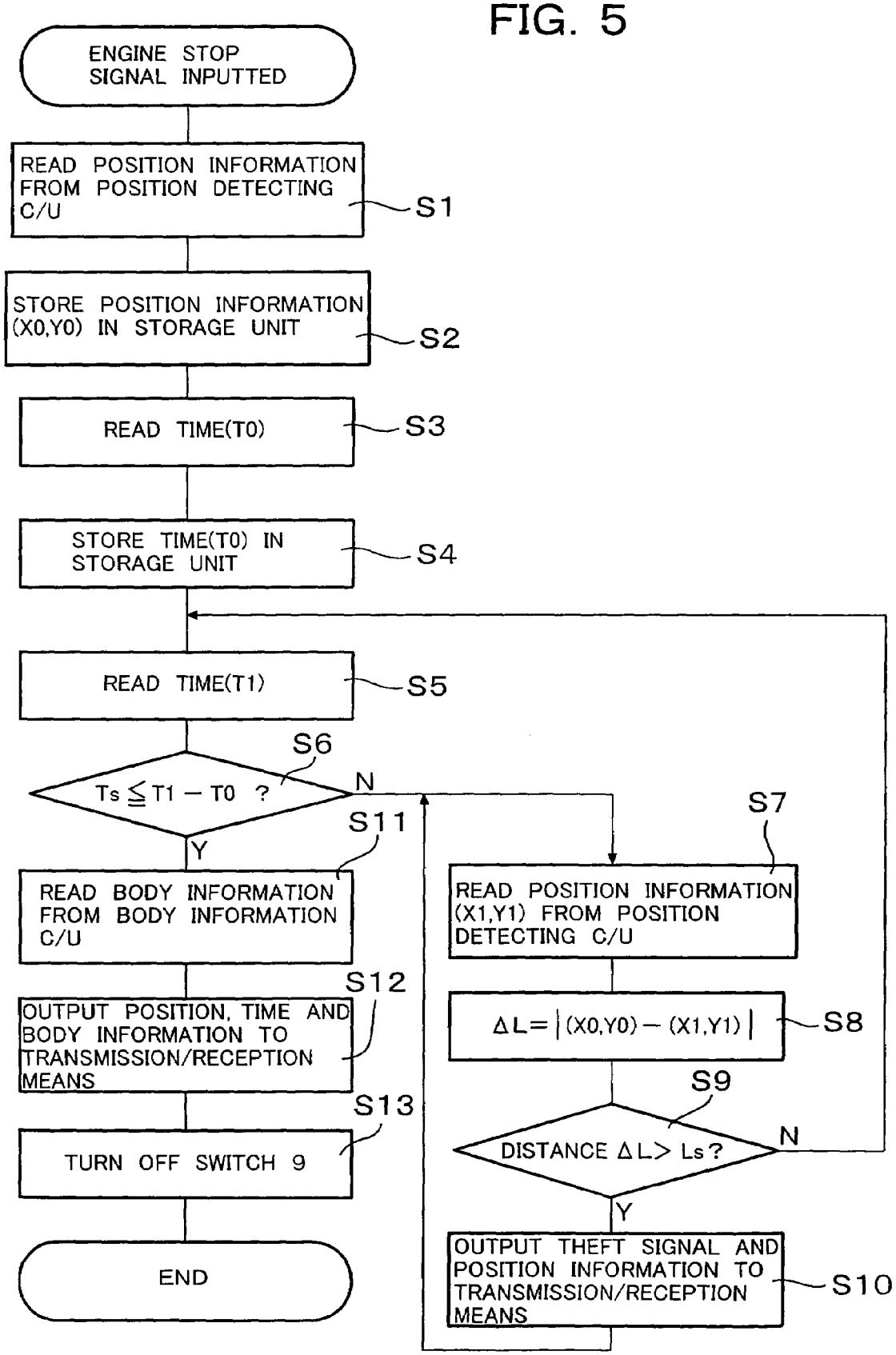
FIG. 5 is a flow chart showing the details of processing operations until a first predetermined time elapses since the input of an engine stop signal.
Figure 6:
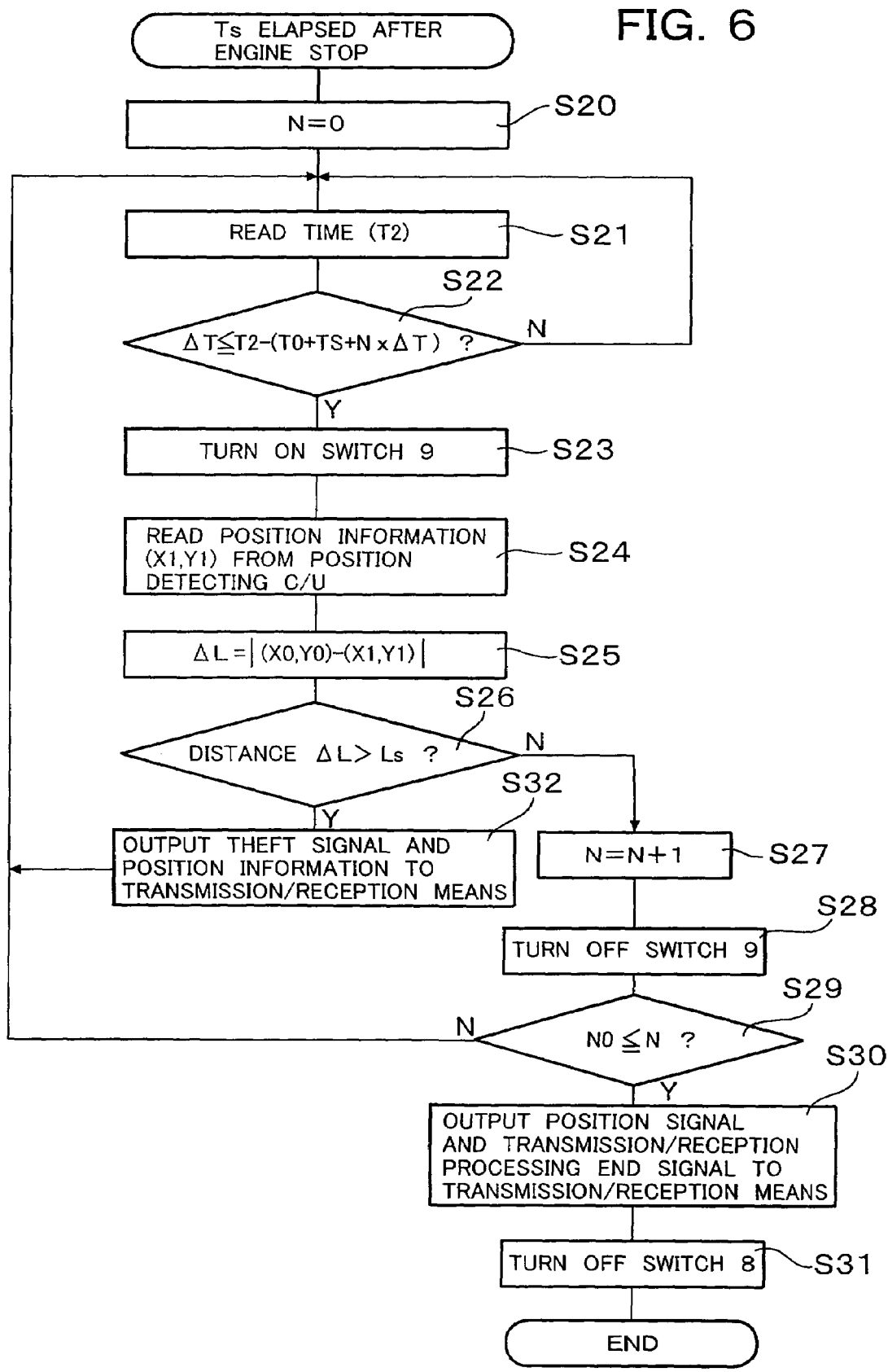
FIG. 6 is a flow chart showing the details of processing operations after the first predetermined time has elapsed subsequent to the input of the engine stop signal.
Figure 7:
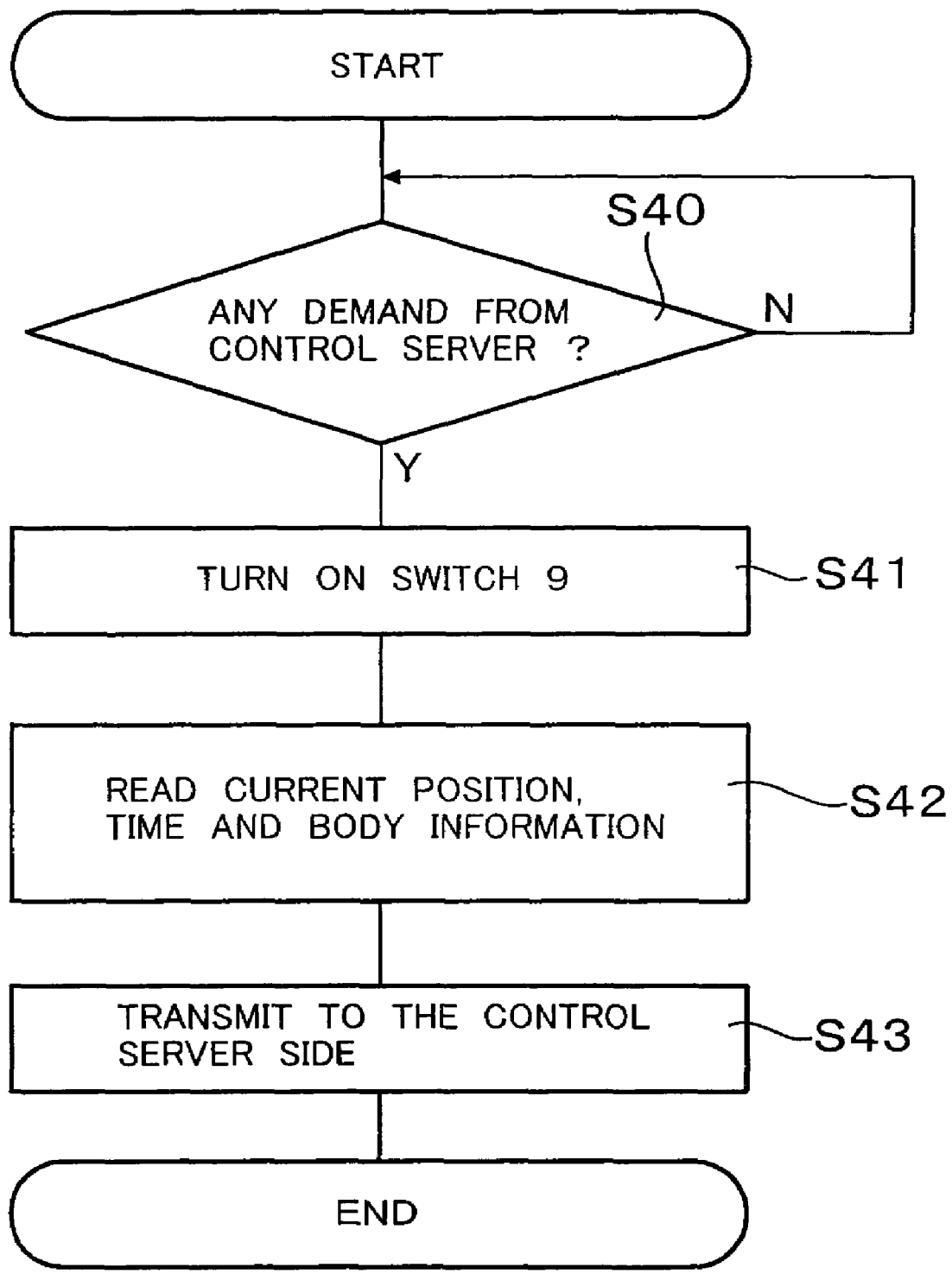
FIG. 7 is a flow chart showing processing when an information demand signal has been inputted from a control server.
Figure 8:
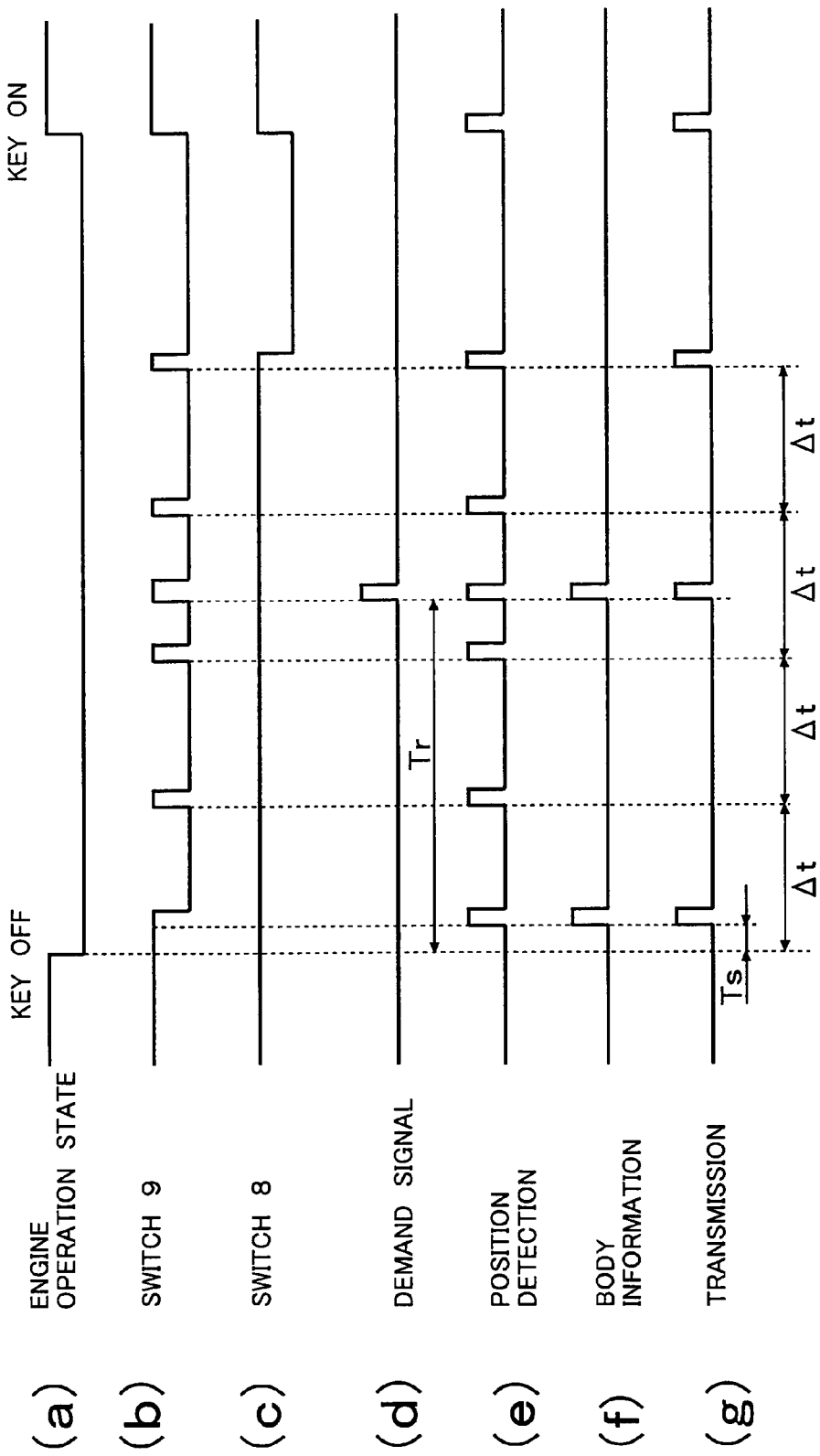
FIG. 8 is a time chart after the engine stop signal has been inputted.

FIG. 1 through FIG. 8 are drawings for describing the first embodiment of the present invention, in which FIG. 1 is an overall construction diagram of an antitheft system according to the first embodiment of the present invention, FIG. 2 is a block diagram of a main controller constructing the antitheft system shown in FIG. 1, FIG. 3 is a block diagram of a position detecting control unit, FIG. 4 is a block diagram of a body information control unit, FIG. 5 is a flow chart of processing operations until a first predetermined time Ts elapses since the input of an engine stop signal, FIG. 6 is a flow chart of processing operations after Ts has elapsed subsequent to the stopping of the engine, FIG. 7 is a flowchart of processing when an information demand signal has been inputted from a control server, and FIG. 8 is a time chart after the engine stop signal has been inputted.

As shown in FIG. 1, the antitheft system according to this embodiment is provided with a control system 1 to be mounted on a self-propelling movable object, for example, a hydraulic excavator with an engine 7 mounted as a drive source thereon and also with a control server 10 for performing transmissions/receptions of information with the control system 1, which is located at a remote plate, via a wireless communication means 11 such as satellite communication or telephone line communication and also for managing a control of information on the hydraulic excavator.

The control system 1 is provided with a position detecting control unit 3 for detecting the position of the hydraulic excavator by GPS, a body information control unit 5 for fetching signals from various sensors arranged on the hydraulic excavator and detecting and storing various information on operations of the hydraulic excavator, a transmission/reception control unit 4 for performing transmissions/receptions of information with the control server 10, and a main controller 2 for controlling the respective control units 3, 4, 5 systematically and performing predetermined processing operations.

To the respective control units 3, 4, 5 and the main controller 2, power is fed by a battery 6 mounted on the hydraulic excavator. In this embodiment, the position detecting control unit 3 and body information control unit 5 are connected to the battery 6 via a switch 9 as a first power feeding means, while the main controller 2 and transmission/reception control unit 4 are connected to the battery 6 via a switch 8 as a second power feeding means.

To the control server 10, on the other hand, terminal equipment 12a, 12b, 12c are connected via a network to permit an access by the owner, maker, service mechanic or the like of the hydraulic excavator to the control server 10 for the confirmation of an operation state of the hydraulic excavator.

The main controller 2 is provided, as shown in FIG. 2, with a control unit 2a comprising a CPU to control the above-mentioned, respective control units 3, 4, 5, switch 8 and switch 9 systematically and to perform predetermined processing operations, a storage unit 2b for storing processing results temporarily in the course of processing operations and also storing various parameters and the like, and a clock unit 2c as a clocking means. In addition, signals relating to an operation or stop of the engine 7 are also inputted.

The position detecting control unit 3 is provided, as shown in FIG. 3, with a position detecting control unit 3c for capturing signals from unillustrated GPS satellites and calculating the position of the hydraulic excavator, a storage unit 3b for storing the thus-detected position information and a preset operable area for the hydraulic excavator, and a control unit 3a for performing transmissions/receptions of signals with the main controller 2, reading results of a detection by the position detecting unit 3c, and performing processing to store the results of the detection in the storage unit 3b.

The body information control unit 5 is provided, as shown in FIG. 4, with a control unit 5a for performing transmissions/receptions of signals with the main controller 2 and fetching information from the unillustrated various sensors mounted on the hydraulic excavator, and a storage unit 5b for storing the information fetched from the sensors.

In the antitheft system according to this embodiment constructed as described above, while the engine 7 is in operation, the switch 8 and switch 9 always maintain their turned-on positions so that power is fed to the respective control units 3, 4, 5 and the main controller 2.

In this state, the position detecting unit 3c which instructs the position detecting control unit 3, no matter whether or not there is an instruction signal from the control unit 3a, calculates the current position of the hydraulic excavator from signals from the GPS satellites upon capturing the signals, and outputs the results to the control unit 3a. The control unit 3a compares the inputted current position with the operable area stored in the storage unit 3band, when the current position departs from the operable area, outputs information on the current position and a theft signal to the main controller 2.

When an instruction signal has been inputted form the main controller 2, position information calculated based on processing at the control unit 3a is stored in the storage unit 3b. This instruction signal from the main controller 2 is designed such that it is inputted at preset time intervals, for example, every hour. It is, however, also possible to store such position information whenever calculated, without relying upon instructions from the main controller 2.

The body information control unit 5 progressively stores signals, which are fed in predetermined sampling cycles from the various sensors, in time sequence in the storage unit 5b via the control unit 5a. On the other hand, when the coolant temperature of the engine 7 has become abnormally high and an abnormality signal serious for the operation of the hydraulic excavator such as falling of the rotational speed of the engine 7 below a predetermined lowest rotational speed has been inputted by so-called interrupting processing, the abnormality signal is immediately outputted to the main controller 2.

When the theft signal has been inputted from the position detecting control unit 3 or the abnormality signal has been inputted from the body information control unit 5, the main controller 2 outputs an instruction signal to the transmission/reception control unit 4 to transmit the signal to the control server 10.

When the transmission/reception control unit 4 has received a data-demanding signal from the control server 10 or when a predetermined time has been reached, the main controller 2 instructs to send the position information and body information, which are stored in the position detecting control unit 3 and body information control unit 5, respectively, to the main controller 2, inputs these information, and outputs an instruction signal to the transmission/reception control unit 4 such that they are transmitted to the control server 10.

When the instruction signal is inputted from the main controller 2, the transmission/reception control unit 4 transmits the position information, theft signal, body information, abnormality information or the like to the control server 10 via the communication means 11.

A description has been made about the processing by the respective control units 3, 4, 5 and the main controller 2 when the engine 7 is in operation. With reference to FIG. 5 through FIG. 8, a description will next be made about processing after a stop signal has been inputted into the main controller 2 from the engine 7.

When the stop signal of the engine 7 has been inputted as illustrated in FIG. 5, the main controller 2 reads in the first Step S1 the latest position information stored in the storage unit 3b of the position detection control unit 3, and in the next Step S2, stores the thus-read position information (X0, Y0) in the storage unit 2b of the main controller 2.

The time T0 at which the stop signal of the engine 7 was inputted is read from the clock unit 2c in the next Step S3, and is stored in the storage unit 2b in Step S4.

In Step S5, a current time T1 is read from the clock unit 2c, and in the next Step S6, a determination is made as to whether or not a predetermined time Ts, for example, 3 hours or so have elapsed from the input of the stop signal of the engine 7. If not determined to have elapsed, the routine moves to Step S7.

In Step S7, current position information (X1, Y1) is read from the position detecting control unit 3, and in the next Step S8, the distance $\Delta L$ from the position (X0, Y0) at the time point of the input of the stop signal of the engine 7 is calculated. It is then determined in the next Step S9 whether or not the thus-calculated distance $\Delta L$ is greater than a predetermined distance Ls. When the distance $\Delta L$ is determined to be smaller than the predetermined distance Ls in Step S9, the hydraulic excavator is not determined to have been stolen, the routine returns to Step S5 and the processing operations of Steps S5 to S9 are repeated.

When the thus-calculated distance $\Delta L$ is determined to be equal to or greater than the predetermined distance Ls in Step S9, the routine moves to Step S10. After an instruction signal is outputted to the transmission/reception control unit 4 such that a theft signal and the position information (X1,Y1) at that time are transmitted to the control server 10, the routine returns to Step S7 and the processing operations of Step S7 to Step S10 are repeatedly performed.

When the predetermined time Ts is determined to have elapsed after the input of the stop signal of the engine 7 in Step S6, the routine moves to Step S11, and the body information stored in the storage unit 5b of the body information control unit 5 is read and is once stored in the storage unit 2b. In Step S12, an instruction signal is outputted to the transmission/reception control unit 4 such that the stored body information, current time T1 and position information (X1, Y1) are transmitted to the control server 10. In the next Step S13, a turn-off signal is outputted to the switch 9 so that the feeding of power to the position detecting control unit 3 and body information control unit 5 is cut off.

As described above, the switch 9 retains its turned-on position until the predetermined time Ts elapses after the input of the stop signal from the engine 7. During this period, it is possible to ascertain whether or not the hydraulic excavator has been stolen in a similar manner as in the time of an operation of the engine. When determined to have been stolen, a report can be immediately made to the control server 10 located at the remote place.

With reference to FIG. 6, a description will next be made about the details of processing after the predetermined time Ts has elapsed after the input of the stop signal of the engine 7.

As described above, the switch retains its turned-on position even after the predetermined time Ts has elapsed subsequent to the input of the stop signal from the engine 7. Power is, therefore, still continuously fed from the battery 6 to the main controller 2 and transmission/reception control unit 4. In the first Step S20 after the predetermined time Ts has elapsed, a variable N for counting is set at 0, and in the next Step S21, the current time T2 is read from the clock unit 2c.

In the next Step S22, a determination is made as to whether or not a predetermined time interval ΔT has elapsed from the time of the preceding processing. When ΔT is not determined to have elapsed, the routine returns to Step S21. When ΔT is determined to have elapsed, on the other hand, the routine advances to the next Step S23.

In Step S23, an instruction signal is outputted to turn on the switch 9 which has been in the turned-off position. As a result, power is fed to the position detecting control unit 3, and at the position detecting control unit 3, the position is detected and the current position information (X1,Y1) is outputted to the main controller 2.

In Step S24, the thus-outputted current position information (X1,Y1) is read, and in the next Step S25, the distance ΔL from the position (X0, Y0) at which the stop signal of the engine 7 was inputted is calculated. In Step S26, a determination is made as to whether or not the thus-calculated distance ΔL is greater than the predetermined distance Ls. When determined to be smaller, the routine moves to Step S27.

In Step S27, 1 is added to the variable N, and in the next Step S28, a signal is outputted to turn off the switch 9. As a result, the feeding of power to the position detecting control unit 3 is cut off.

In the next Step S29, a determination is made as to whether or not the processing operations from Steps S21 to S27 have reached a predetermined number of times N0. When N0 has not been reached yet, the routine is returned to Step S21.

When the distance ΔL calculated in Step S25 is determined to be greater than the predetermined distance Ls in Step S26, the routine moves to Step S32, and an instruction signal is outputted to the transmission/reception control unit 4 such that a theft signal and the position information (X1,Y1) at that time are transmitted to the control server 10. When this instruction signal is inputted, the transmission/reception control unit 4 transmits the current position information (X1,Y1) together with the theft signal to the control server 10.

When the number of processing operations, N, is determined to have reached N0 in Step S29, on the other hand, the routine moves to Step S30, and an instruction signal is outputted to the transmission/reception control unit 4 such that a signal to the effect that the transmission/reception processing is to end is transmitted together with the current position information (X1, Y1) to the control server 10. When this indication signal is inputted, the transmission/reception control unit transmits a signal, which informs the control server 10 to the effect that the transmission/reception processing has ended, together with the current position information (X1, Y1) to the control server 10.

In the next Step S31, a turn-off signal is outputted to the switch S8. As a result, the feeding of power to the main controller 2 and transmission/reception control unit 4 is cut off so that at the control system 1, processing operations and transmissions/receptions with the outside are disabled.

With reference to FIG. 7, a description will be made about processing operations when the transmission/reception control unit 4 has received a data-demanding signal from the control server 10 at a stage preceding the output of the cut-off signal to the switch 8. As illustrated in FIG. 7, a turn-on signal is outputted to the switch 9 in Step S41 when the demand signal is inputted from the control server 10.

When the switch 9 is brought into the turned-on position and power is fed to the position detecting control unit 3 and body information control unit 5, the detection of a position at that time point is performed at the position detecting control unit 3.

In the next Step S42, the current position information is read from the position detecting control unit 3, and further, body information is read from the body information control unit 5 and the current time is also read from the clock unit 2c. In the next Step S43, an instruction signal is outputted to the transmission/reception control unit 4 such that they are transmitted to the control server 10. When this instruction signal is inputted, the transmission/reception control unit 4 transmits the position information and body information together with the current time to the control server 10.

FIG. 8 is a time chart which shows in time sequence the processing operations in FIG. 5 to FIG. 7. As also shown in FIG. 8, in this embodiment, the switch 9 and switch 8 continuously retain their turned-on positions until the first predetermined time Ts elapses subsequent to the input of a stop signal (key off) of the engine 7 ((b), (c)), and after an elapse of Ts, the position information and body information on the hydraulic excavator are transmitted to the control server ((e), (f), (g)), and the switch 9 is turned off ((b)). After that, the turn-on and turn-off of the switch 9 are repeated at the predetermined time intervals Δt ((b)) and, whenever the switch 9 is brought into its turned-on position, the detection of a position at that time point is performed ((e)). When the predetermined time intervals Δt reach a predetermined number of times NO (4 times in FIG. 8), the position information and a signal that indicates the end of the transmission/reception processing are fed to the control server 10 ((g)), and the switch 8 and switch 9 are brought into their cut-off positions ((b), (c)).

In this embodiment, power is, therefore, intermittently transmitted from the battery 6 to the position detecting control unit 3 and body information control unit 5 via the switch 9 after the first predetermined time Ts has elapsed subsequent to a stop of the engine 7. It is, accordingly, possible to cut down the consumption of as much power at the position detecting control unit 3 and body information control unit 5 as the stop of the feeding of power. As a consequence, it is possible to prolong the time until the battery mounted on the hydraulic excavator comes into the state of a battery drainage.

With the control system 1 mounted on the hydraulic excavator, it is also possible to determine despite the stopping of the engine 7 whether or not the hydraulic excavator has been moved, in other words, stolen. Because a report is made to the side of the control server 10 via the transmission/reception control unit 4 only when the hydraulic excavator is determined to have been stolen, the number of communications with the control server 10 can be reduced so that the communication cost can be kept low.

The above-described first embodiment is designed such that, after the predetermined time Ts has elapsed subsequent to the input of the stop signal of the engine 7, the switch 9 is intermittently turned on and off only the predetermined number of times NO at predetermined time intervals Δt and a positional detection is performed every time the switch 9 is turned on. Instead of the predetermined number of times No, however, it is also possible to intermittently turn on and off the switch 9 at predetermined time intervals At until a second predetermined time Ts' elapses subsequent to the input of the stop signal of the engine 7. This processing is shown in FIG. 9.

Figure 9:
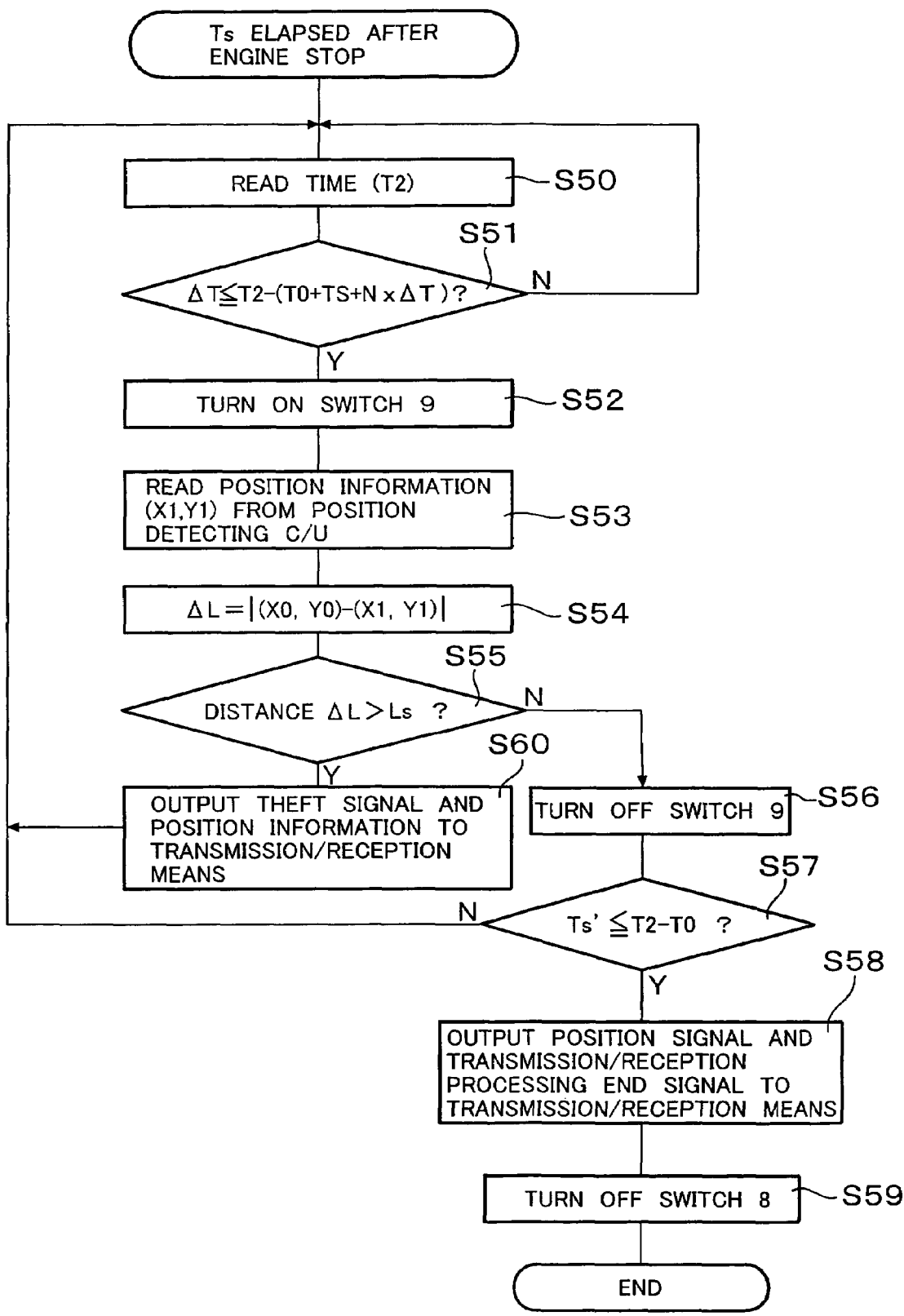
FIG. 9 is a flow chart illustrating a modification of the processing in the first embodiment as shown in FIG. 6.

The flow chart shown in FIG. 9 is equal to the processing shown in FIG. 6 except for Step S57. In Step S57, a determination is made as to whether or not the second predetermined time Ts' has elapsed after the input of the stop signal from the engine 7. When not determined to have elapsed, the routine returns to the first Step S50 and Step S50 to Step S57 are performed again. When the predetermined time Ts' is determined to have elapsed in Step S57, on the other hand, an instruction signal is outputted such that position information (X1, Y2) and a signal to the effect that the transmission/reception processing is to end are transmitted to the control server 10, and a turn-off signal is outputted to the switch 8 (Step S58 and Step S59) By the processing shown in FIG. 9, it is, therefore, also possible to bring about similar advantageous effects as the first embodiment.

In the above-described first embodiment, it is constructed that the main controller 2 is provided with the clock unit 2c and power is fed from the battery 6 to the main controller 2 and clock unit 2c via the switch 8. As an alternative, it is also possible to arrange a clocking means independently of the main controller 2 and to feed power to the clocking means, for example, by a lithium battery different from the battery mounted on the hydraulic excavator. In this case, it is also possible, as illustrated in FIG. 10(h), to provide the clocking means with a timer function such that an ON signal is outputted at predetermined time intervals Δt and based on the ON signal, a turn-on signal is outputted to the switch 9. It is also possible to connect the battery 6 to the main controller 2, position detecting controller unit 3, transmission/reception control unit 4 and body information control unit 5 via the switch 8 alone and to intermittently feed power to the main controller 2 and the respective controller units 3, 4, 5 in accordance with timer signals from the clocking means. In this case, the lithium battery serves as a second power feeding means.

The invention claimed is:

1. An antitheft system provided with:
a control system arranged on a self-propelling movable object with an engine mounted thereon as a drive source and having a position detecting means for detecting a position of said movable object, a transmission/reception means for performing a transmission/reception to/from an outside and a processing means for performing predetermined processing operations including outputs of run commands to said position detecting means and said transmission/reception means, and
a control server arranged at a place different from said movable object for controlling information on said movable object, said information comprising position information detected by said position detecting means and transmitted via said transmission/reception means, characterized in that said antitheft system comprises:
a clocking means, a first power feeding means for performing feeding of power to at least said position detecting means, and a second power feeding means for performing feeding of power to at least said clocking means; and
said processing means receives signals from said clocking means, allows said first power feeding means to continuously feed power until a first predetermined time elapses from a time point at which a stop signal for said engine is inputted, and after an elapse of said first predetermined time, repeatedly outputs an instruction signal, which permits feeding of power, at predetermined time intervals to said first power feeding means; and
wherein said control system is provided with a storage means for storing said position information on said movable object as detected by said position detecting means; and said processing means compares position information, which has been detected subsequent to said input of said stop signal for said engine, with said position information stored in said storage means and, when a distance difference of at least a predetermined value is confirmed, determines that said movable object has been stolen, and instructs said transmission/reception means to transmit a theft signal together with said position information to said control server.

2. An antitheft system according to claim 1, wherein said processing means reads said position information on said movable object as detected by said position detecting means whenever said instruction signal, which permits said feeding of power, is outputted at said predetermined time intervals to said first power feeding means, and after completion of said reading of said position information, instructs said first power feeding means to stop feeding of power.

3. An antitheft system according to claim 2, wherein, when a second predetermined time has elapsed subsequent to an elapse of said first predetermined time, said processing means instructs said transmission/reception means to transmit said position information on said movable object, which was detected lastly by said position detecting means, and a signal, which communicates that a transmission/reception to/from said outside via said transmission/reception means is disabled, to said control server.

4. An antitheft system according to claim 3, wherein, when said movable object is determined to have been stolen, said processing means outputs instruction signal, which permits continuous feeding of power, to said first power feeding means.

5. An antitheft system according to claim 1, wherein said second power feeding means is connected to perform feeding of power to said transmission/reception means; and, when said instruction signal has been inputted from said control server via said transmission/reception means before a transmission/reception to/from said outside via said transmission/reception means is disabled, said processing means instructs said transmission/reception means to transmit at least said position information, which has been stored in said storage means, to a side of said control server.

6. An antitheft system according to claim 5, wherein, when a signal communicating that a transmission/reception is disabled has been transmitted to said control server via said transmission/reception means, said processing means instructs said second power feeding means to stop feeding of power.

7. An antitheft system provided with:
a control system arranged on a self-propelling movable object with an engine mounted thereon as a drive source and having a position detecting means for detecting a position of said movable object, a transmission/reception means for performing a transmission/reception to/from an outside and a processing means for performing predetermined processing operations including outputs of run commands to said position detecting means and said transmission/reception means, and
a control server arranged at a place different from said movable object for controlling information on said movable object, said information comprising position information detected by said position detecting means and transmitted via said transmission/reception means, characterized in that said antitheft system comprises:
a clocking means, a first power feeding means for performing feeding of power to at least said position detecting means, and a second power feeding means for performing feeding of power to at least said clocking means; and
said processing means receives signals from said clocking means, allows said first power feeding means to continuously feed power until a first predetermined time elapses from a time point at which a stop signal for said engine is inputted, and after an elapse of said first predetermined time, repeatedly outputs an instruction signal, which permits feeding of power, at predetermined time intervals to said first power feeding means;

wherein said processing means reads said position information on said movable object as detected by said position detecting means whenever said instruction signal, which permits said feeding of power, is outputted at said predetermined time intervals to said first power feeding means, and after completion of said reading of said position information, instructs said first power feeding means to stop feeding of power; and wherein, when said command signal which permits feeding of power has been outputted a predetermined number of times at said predetermined time intervals to said first power feeding means, said processing means instructs said transmission/reception means to transmit said position information on said movable object, which was detected lastly by said position detecting means, and a signal, which communicates that a transmission/reception to/from said outside via said transmission/reception means is disabled, to said control server. signal, which communicates that a transmission/reception to/from said outside via said transmission/reception means is disabled, to said control server.

8. An antitheft system according to claim 7, wherein, when said movable object is determined to have been stolen, said processing means outputs an instruction signal, which permits continuous feeding of power, to said first power feeding means.

9. An antitheft system according to claim 7, wherein, when a second predetermined time has elapsed subsequent to an elapse of said first predetermined time, said processing means instructs said transmission/reception means to transmit said position information on said movable object, which was detected lastly by said position detecting means, and a signal, which communicates that a transmission/reception to/from said outside via said transmission/reception means is disabled, to said control server.

10. An antitheft system according to claim 9 wherein, when said movable object is determined to have been stolen, said processing means outputs instruction signal, which permits continuous feeding of power, to said first power feeding means.

* * * * *